Nov. 9, 1954   P. F. HUTTEMANN ET AL   2,693,666
FOAMING BED FOR THE FOAMING OF FIERY MOLTEN MASSES
Filed June 7, 1952

Inventor:
Paul F. Hüttemann
Günter A. Klotzbach
Otto K. Vorwerk
Marcel Gallai-Hatchard
By Walter Becker.

United States Patent Office 2,693,666
Patented Nov. 9, 1954

2,693,666

FOAMING BED FOR THE FOAMING OF FIERY MOLTEN MASSES

Paul F. Hüttemann, Günter A. Klotzbach, and Otto K. Vorwerk, Rheinhausen, Germany, and Marcel Gallai-Hatchard, Cheam, England, assignors to Huttenwerk Rheinhausen Aktiengesellschaft, Rheinhausen, Germany Application June 7, 1952, Serial No. 292,358

Claims priority, application Germany November 10, 1951

3 Claims. (Cl. 49—1)

The present invention relates to a foaming bed for the foaming of fiery molten masses, for example blast furnace slag, in which the mass is caused to foam by a foaming agent, for example water, which rises through nozzles in the bottom of the foaming bed. In the co-pending Klotzbach application Ser. No. 282,398, filed April 15, 1952, there has been described an improved foaming bed for fiery molten masses the bottom of which includes a grate arrangement.

It is an object of the present invention further to improve a foaming bed having a bottom with a grate arrangement.

It is another object of this invention to provide an improved foaming bed for the foaming of fiery molten masses, in which the bottom of the bed is so constructed as to include means which will serve as guiding means along which the foamed slag and the scraper, if used, will slide while the bed is being emptied.

It is also an object of this invention to provide a foaming bed of the type set forth in the preceding paragraph, in which the means which will present the guiding means for the foamed slag are so constructed as to allow a thermal expansion of parts of the bottom.

These and other objects and advantages of the invention will appear more clearly from the following specification in connection with the accompanying drawings in which.

General arrangement

Figure 1:
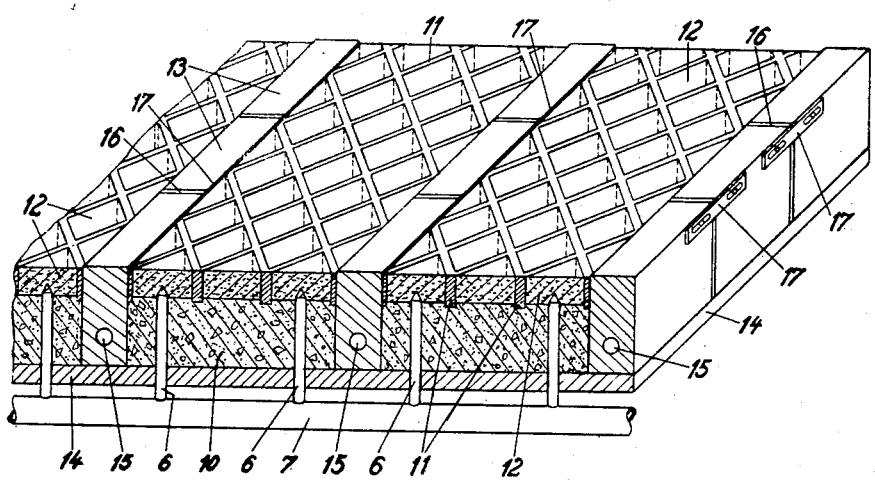
Fig. 1 is an isometric view of an embodiment of a foaming bed according to the invention.

In order to protect the upper surface of the grate, which lies higher than the upper surface of the porous filling material, against the destructive influence of the hot slag and the scraper while the bed is being emptied, a preferred arrangement according to the present invention is such that some grate bars extend in vertical direction to a higher level than the other grate bars and thus present guiding surfaces along which the foamed slag and the scraper, if a scraper is used, may slide while the bed is being emptied.

It is advisable, particularly in the case of tiltable foaming beds, to combine the grate bars in individual parts of the foaming bed to form gratings which are elastically connected together so that the connection can yield under the differential thermal expansion of the parts of the grate. It is, of course, necessary to bridge the gaps which extend at a right angle to the direction in which the bed is being emptied and which are provided between the ends of those grate bars or gratings that present the said guiding surfaces. It will be evident that the last mentioned grate bars and gratings will have to be kept short in order to avoid thermal stresses. The bridging of the said gaps may be effected similar to the connection of rail joints, e. g. by overlapping tongues or laterally disposed fish plates the upper edges of which are flush with the above mentioned guiding surfaces, said tongues or fish plates forming a yieldable connection between the grate bars or between the gratings.

To increase the life of the grate bars, it is to be recommended that they have passages through which a cooling agent may be passed. This is particularly desirable with those grate bars which present the above mentioned guiding surfaces and are exposed directly to the heat of the slag.

The invention is applicable to both fixed and tiltable foaming beds.

Structural arrangement

Referring now to the drawings in detail, the bottom of the foaming bed portion shown therein comprises grate bars 11 which extend into the bottom part 10 of the foaming bed. This bottom part may be of concrete or of honeycomb concrete. Between these grate bars 11 is a porous filling 12 e. g. foamed slag. The bottom of the foaming bed is divided into so-called foam fields by grate bars or partition elements 13. The bottom part 10 and partition elements 13 rest on the bottom part 14 which may be made of iron or reinforced concrete. The partition elements or taller grate bars 13 are provided with bores 15 for receiving a cooling medium. The ends of the partition elements 13 are slightly spaced from each other and the gaps 16 therebetween are bridged by fish plates 17. These fish plates are arranged so that their upper longitudinal edges are flush with the upper surfaces of the partition elements 13 interconnected thereby so that the scraper used for emptying the bed cannot drop into said gaps. Furthermore, the partition elements or grate bars 13 are taller than the grate bars 11 so that the upper surface of the grate bars 11 is at a lower level than the upper surface of the grate bars or partition elements 13. Thus, the hot slag and the scraper sliding along the upper surface of the taller grate bars 13 are higher than the upper surface level of the grate bars 11.

Figure 2:
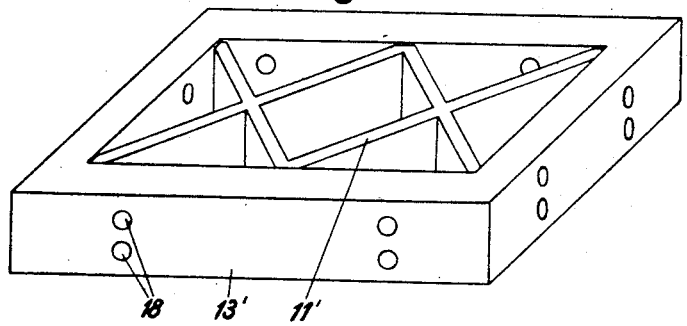
Fig. 2 is an isometric view of a grate bar grating according to the invention.

According to the embodiment of Fig. 2, the grate bars 11' are combined to form box-like gratings 13'. The side members of the gratings 13' have bores 18 to permit of the gratings 13' being bolted together. These gratings are joined together to form a foaming bed similar to that of Fig. 1.

Prior to the foaming process, the foaming agent is supplied through the pipes 7 and nozzles 6 to the foaming bed in a sufficient quantity to fill the cavities in the filling of the pan. This quantity of foaming agent is immediately available at the start of the foaming process. During the foaming process, further foaming agent is supplied through pipe 7 to the required extent. At the end of the foaming process and after the supply of foaming agent has been shut off, the outlet pipe 9 is opened and the excess foaming agent in the filling of the pan is discharged.

It is, of course, understood that the present invention is, by no means, limited to the particular constructions shown in the drawings but also comprises any modifications within the scope of the appended claims.

What we claim is:

1. A bottom for a foaming bed for foaming fiery molten masses, which comprises in combination, a group of first grate bars arranged relative to each other so as to form a grate, porous material filling the interstices between said grate bars, pipe means extending into said porous material for supplying foaming agent thereinto, and a group of second grate bars subdividing said first grate bars into a plurality of foaming fields and extending to a higher level than the grate bars of said first group, to thereby serve as guiding means upon which the foamed masses and a scraper will slide while the bed is being emptied.

2. In combination in a foaming bed for foaming fiery molten masses, a plurality of grate bars intersecting each other so as to form a grate having a plurality of cells, porous material in said cells, a plurality of rows of wall elements extending in longitudinal direction of said bed and subdividing said grate into a plurality of grate fields, the elements of each row having their ends slightly spaced from each other, means having the upper surface thereof substantially flush with the upper surface of said elements and respectively yieldably bridging the gaps between each two adjacent ends of the elements in each row so as yieldably to interconnect the elements pertaining to one and the same respective row while simultaneously providing for a continuous guiding path along the upper surface of said elements, the upper surface of said elements being located at a level higher than the level of the upper surface of said grate bars, and nozzle means extending into said porous material for conveying foaming agent thereto.

3. A foaming bed for foaming fiery molten masses, which includes in combination, a plurality of grate bars intersecting each other so as to form a grate with a plurality of cells, a plurality of rows of wall elements extending in longitudinal direction of said bed and intersecting said grate bars so as to subdivide said grate into a plurality of grate fields, the elements of each row having their ends slightly spaced from each other, means respectively yieldably interconnecting the adjacent ends of the elements of one and the same row to allow differential thermal expansion of the grate and of said elements, at least the said elements being provided with cooling ducts for receiving and passing a cooling agent therethrough, porous material in said cells, and foaming agent supply means extending into said porous material.

References Cited in the file of this patent

UNITED STATES PATENTS

| Number | Name | Date |
|---|---|---|
| 242,964 | Nikiforoff | June 14, 1881 |
| 824,340 | Clark | June 26, 1906 |
| 1,540,776 | Hafner | June 9, 1925 |
| 1,959,328 | Bartholomew | May 22, 1934 |

FOREIGN PATENTS

| Number | Country | Date |
|---|---|---|
| 562,054 | Great Britain | June 15, 1944 |